Nov. 18, 1958  C. N. CROSSLEY  2,860,498
BALL ACTION SLIP CLUTCH
Filed April 4, 1955  2 Sheets-Sheet 1

INVENTOR.
CHARLES N. CROSSLEY
BY
William P. Lane
ATTORNEY

Nov. 18, 1958

C. N. CROSSLEY 2,860,498

BALL ACTION SLIP CLUTCH

Filed April 4, 1955

2 Sheets-Sheet 2

INVENTOR.
CHARLES N. CROSSLEY
BY
William R. Lane
ATTORNEY

United States Patent Office 2,860,498
Patented Nov. 18, 1958

2,860,498

BALL ACTION SLIP CLUTCH

Charles N. Crossley, Whittier, Calif., assignor to North American Aviation, Inc.

Application April 4, 1955, Serial No. 499,051

4 Claims. (Cl. 64—29)

This invention relates to a ball-type slip clutch which is made to slip within reasonably close limits, and which is relatively unaffected by climatic variations.

Slip clutch couplings are desirable for use in automatic machinery to prevent driving such a machine beyond the rated capacity or breaking strength of the integral parts when the torque is suddenly increased by some resistance within the machine. Special problems occur when such a clutch or slip coupling is operated at considerable variations in temperature and humidity, as they are in some of the newer complex airborne instruments, such as a computer. There is a tendency in existing slip clutches to freeze or slip as a result of temperature changes or from the presence of surface lubrication caused by excessive humidity. The present invention is a compact, ball-type slip clutch which affords a positive drive for any precalculated torque load and which will not freeze or slip from this load as a result of temperature changes or humidity changes.

Figure 1:
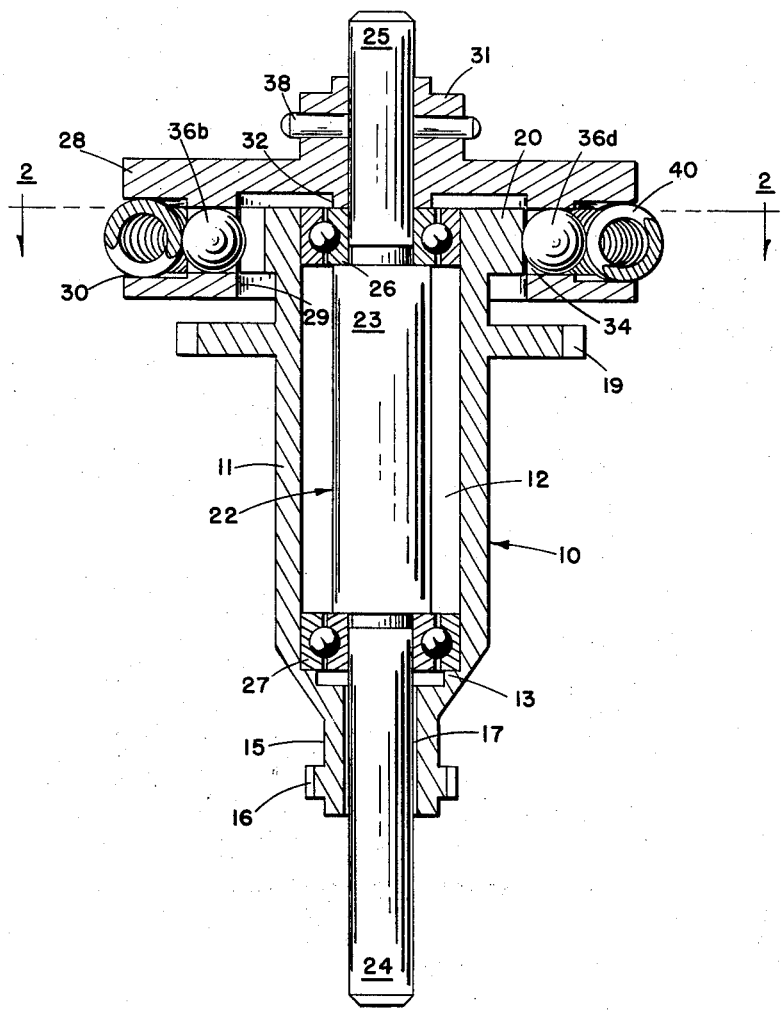
Figure 2:
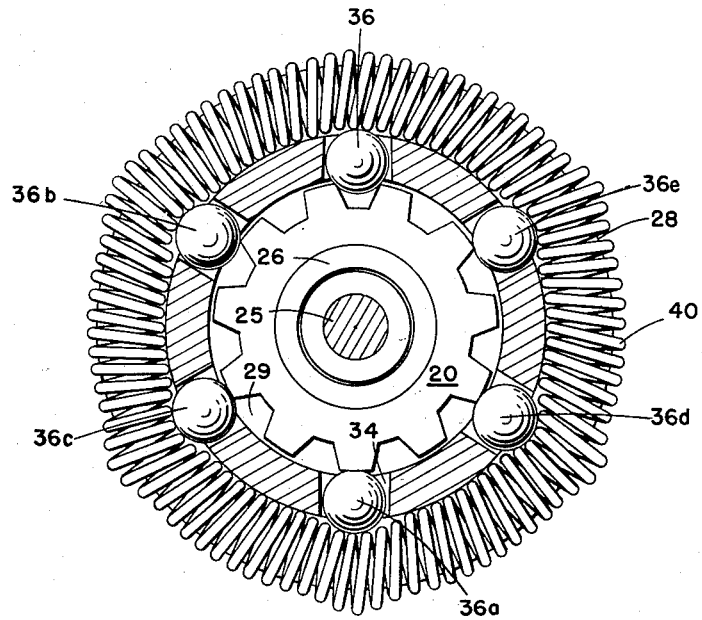

The present invention overcomes the problem of freezing or slipping as a result of temperature of humidity changes in that it is independent, as nearly as possible, of the coefficient of friction of the component materials. The basic action of the clutch is dependent upon the force required to roll a steel ball up an inclined plane, and not upon the friction force between two component materials. The preferred embodiment of this invention, as shown in Figs. 1 and 2, is made for use in a computer where damage would result if a resistance of 16 ounce/inches of torque occurred in part of the driven structure. The clutch for this computer has been created to slip between the limits of 10 and 14 ounce/inches. That is, the clutch can start to slip at 10 ounce/inches but it will positively slip at 14 ounce/inches.

Therefore, an object of this invention is to provide an improved ball-type clutch which affords a positive drive for any precalculated torque load.

A principal object of this invention is to provide a slip clutch which is compact and which will not freeze or slip as a result of temperature or humidity changes.

A further object of this invention is to provide a slip clutch that is independent, as nearly as possible, of the coefficient of friction of the component materials.

Another object of this invention is to provide a slip clutch which will be very smooth in operation and which will positively slip within close limits of torque.

Figure 3:
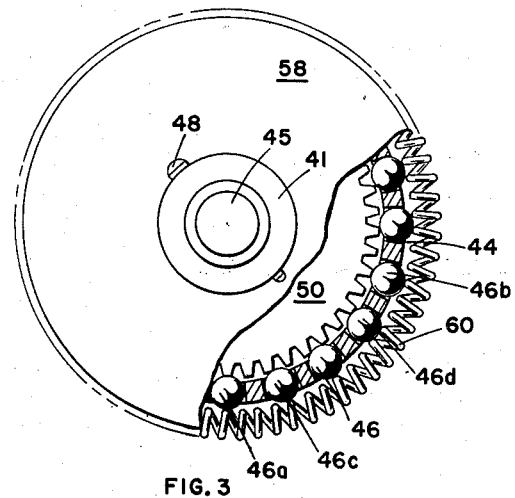

Other objects of invention will become apparent from the following description taken in connection with the accompanying drawings, in which Fig. 1 is a longitudinal cross-sectional view of the slip clutch;

Fig. 2 is a view of the clutch elements surrounding structure taken along the lines 2—2 of Fig. 1; and Fig. 3 is a partially cut-away end view of another emment of the invention.

Referring to Figs. 1 and 2, showing the cross-section of the clutch, cluster gear 10 comprises body portion 11 having hollow portion 12 with a shoulder portion 13. Body 11 terminates in reduced portion 15 which has small gear 16 formed thereon. Portion 15 is provided with passage 17 which extends inwardly to chamber 12. Cluster gear 10 also has formed thereon, intermediate its ends, a narrow, large diameter gear 19, and a heavy gear 20 formed on the right-hand end thereof. The teeth of the gear 20 are machined off to their pitch diameter. This is done for convenience, as the distance between the teeth at the pitch diameter is a standard known figure and may be taken from a gear chart. In the preferred embodiment shown in Fig. 1, gear 20 has eleven teeth. Clutch shaft 22 is provided with a large portion 23 and two small-diameter end portions 24 and 25, and is rotatably supported by bearings 26 and 27. These bearings are held in spaced relation by shaft portion 23, and are pressed into hollow portion 12 of body 11.

On end portion 25 of shaft 22 is fitted retained disc 28, having a counter-bored area 29, a groove 30 around the outer periphery thereof, an outer hub portion 31 and an inner flange 32. Six equally-placed passages 34, shown in plan in Fig. 2, are bored through the portion of the disc 28 between the counter-bored area 29 and groove 30. Each of passages 34 retains a steel ball or clutch element, which are adapted to alternately move between the teeth of gear 20. Gear 20 and retaining disc 28 are maintained in alignment by means of pin 38 which extends through hub 31 and end portion 25 of shaft 22. Extension spring 40 is elastically retained in groove 30 and is the means for retaining balls 36 within passages 34.

Cluster gear 10 is rotatably mounted on shaft 22 so as to be able either to drive retaining disc 28 via gear 20 or be driven by disc 28 via gear 20 with the aid of clutch elements 36. As can be noted in Fig. 2, considering gear 20 to be driving disc 28 in the clockwise direction, ball 36 is engaged as a driver between two of the teeth of gear 20; ball 36a is directly opposite at the peak of a tooth; balls 36b and 36c are at different stages of entrance between teeth; and balls 36d and 36e are in position to leave spaces between the teeth. That is, when the clutch is slipping, the process of two balls entering the spaces between teeth simultaneously while two balls are leaving spaces between teeth eliminates the need for torque calculations relative to the four balls as their movements nullify each other (other than for a small amount of friction), in figuring the requirements of the slip clutch. Thus, the only calculation necessary to determine the torque required to make the clutch slip is that of the force necessary to make one ball climb from within the space between two teeth to the top of one tooth. This calculation of torque is further simplified by the fact that since only one ball is pushing outwardly against extension spring 40, at any one time, spring 40 may be calculated as a simple, double-extension spring rather than as a complicated "Garter" spring.

The above-described operation of the ball slip clutch is the same at any point around the full 360° so that only one ball is affecting the operation of the clutch at any one moment.

In use, if the ball slip clutch is, for example, coupled to a computer mechanism and this mechanism becomes stalled so that cluster gear 10 could not rotate, retaining disc 28 could continue to rotate with drive shaft 22. As retaining disc 28 rotates, the balls will move or roll into and out of driving engagement with the teeth of gear 20 in the manner previously described.

The clutch shown in Figs. 1 and 2 gives very smooth and accurate operation in a device such as a computer mechanism. It is positive acting and can easily be made to slip within the limits of 10 to 14 ounce/inches of torque resistance, which is much closer than most friction clutches. The action of the clutch can be made smoother by increasing the number of balls and teeth. In a preferred embodiment shown in Figs. 1 and 2, the number of balls is an even number; the number of teeth in gear 20 is one less than any multiple of the number of balls. By calculations and experimentation it was found that this combination provided the proper steps for smooth operation of the clutch. The required torque of a given clutch can be changed within reasonable limits simply by employing a weaker or a stronger extension spring, as desired.

An ordinary "in and out" ball action clutch is much jerkier, with the consequent shocks that are damaging to the teeth of a precision gear assembly. Sixty-six increments, or steps, can be obtained using the six balls and the eleven tooth gear in the preferred embodiment shown in Figs. 1 and 2, rather than a large sixty-six tooth gear that would be required for sixty-six steps using an ordinary "in and out" ball clutch.

In Fig. 3 is shown a ball clutch similar to the one shown in Figs. 1 and 2 except that it is made for smoother operation and has the effect of minimizing any errors in the fittings of the ball and gears. For example, if one ball, such as 46 in the exposed quadrant, out of the four which are normally engaged to drive in this particular embodiment should not move or fit properly, the other three balls, one in each of the other three quadrants, will drive the gear or be driven by the gear so as to drive the retaining disc 58 without indicating any improper operation. Spring 60 is the same type as spring 40 in Fig. 2, and holds the balls in passages 44 within the retaining disc 58. The principal differences between the clutch shown in Fig. 3 and that shown in Figs. 1 and 2 is that in the clutch shown in Fig. 3 there are forty-five teeth (an uneven number) in gear 50, and twenty balls (an even number) held in passages 44 within retaining disc 58, the number of notches or gear teeth being greater than the number of balls. In the quadrant of the gear 50 (completely exposed by the cutaway view) one ball, 46, out of the five is shown to be driving or being driven by the gear. In the same manner, one ball in each of the other three quadrants, is driving or being driven by the gear. Thus, considering gear 20 to be the driving disc 28 in the clockwise direction, ball 36 out of each five of the twenty balls, two balls, as 46a and 46b, are fully out of the gear; a third ball, as 46c, is heading into a notch of the gear; ball 46, as stated, is in a notch; and the remaining ball, as 46d, has just come out of a notch. If some malfunction occurs to make gear 50 stick, the clutch will slip and ball 46 will move out out of the driving position into the position of 46d, above. Simultaneously, ball 46c will move into the driving position; ball 46a will move into a position heading into a notch equivalent to the prior position of 46c; ball 46d will move fully out of the gear taking the position of 46b, above; ball 46b will move into the next quadrant into a position equivalent to the new position of 46a; and another ball, not shown, will move into the exposed quadrant into the prior position of 46a. This series of ball movements continues as long as the clutch is caused to slip by the improper sticking of gear 50. This embodiment is the result of calculations made in order to get a more smoothly operating clutch, having a proper number of steps to give a nearly perfect even flow rather than a slippage of balls that may give occasional jerks.

It is believed that a considerably larger version of this slip clutch than could be used in a computer could be used to great advantage in a device such as a power lawnmower, to protect the mechanism, for example, when an obstruction is caught between the flat blade and a moving blade so that they cannot move.

Although the invention has been described and is illustrated in detail it is to be clearly understood that the same is by way of illustration and example only and is not to be taken by way of limitation, the spirit and scope of this invention being limited only by the terms of the appended claims.

I claim:

1. An automatic slip clutch comprising concentric rotatable driving and rotatable driven members, the outer of said members having a plurality of spaced radial apertures and a peripheral outer annular groove communicating with the interior of said member through said apertures, clutch elements carried in said radial apertures, more than one but less than all of said elements drivingly engaging the other of said members in all positions of said driving and driven members, the other of said members having a notched periphery about which said elements are located, the number of notches on said periphery being an even number greater than the number of said elements, and clutch element controlling means comprising a simple, double extension spring encircling said element-holding member and adapted to prevent the centrifugal movement of said elements.

2. An automatic slip clutch comprising concentric rotatable driving and rotatable driven members, the outer of said members having a plurality of spaced radial apertures and a peripheral outer annular groove communicating with the interior of said member through said apertures, clutch elements carried in said radial apertures, less than all but at least one of said elements drivingly engaging the other of said members in all positions of said driving and driven members, said last-mentioned member having a notched periphery about which said elements are located, the number of notches on said periphery being an uneven number greater than the number of said elements, and clutch element controlling means comprising a double extension spring in said annular groove and adapted to restrict the centrifugal movement of said elements.

3. In an automatic slip clutch, an outer ring having a plurality of spaced radial apertures and a peripheral outer annular groove communicating with the interior of said ring through said apertures, an inner disc surrounded by and adapted to rotate with said outer ring, said inner disc having a plurality of spaced notches in its periphery, clutch balls carried in said radial apertures and located about said notches, at least one but not all of said balls drivingly engaged in said notches in all positions of said outer ring and said inner disc, the number of said notches being an uneven number greater than the number of said balls, and a double extension spring in said annular groove adapted to restrict the centrifugal movement of said balls.

4. In an automatic slip clutch, an outer ring having a plurality of spaced radial apertures and a peripheral outer annular groove communicating in the interior of said ring through said apertures, an inner disc surrounded by and adapted to rotate with said outer ring, said inner disc having a plurality of spaced notches in its periphery, clutch balls carried in said radial apertures and located about said notches, only one of said balls drivingly engaged in said notches in all positions of said outer ring and said inner disc, the number of said balls being an even number and the number of said notches being one less than any multiple of the number of said balls, and a double extension spring in said annular groove adapted to restrict the centrifugal movement of said balls.

References Cited in the file of this patent

UNITED STATES PATENTS

| | | |
|---|---|---|
| 1,805,692 | Ferenci | May 19, 1931 |
| 2,631,396 | Yarber | Mar. 17, 1953 |

UNITED STATES PATENT OFFICE
CERTIFICATE OF CORRECTION

Patent No. 2,860,498                                                  November 18, 1958

Charles N. Crossley

It is hereby certified that error appears in the printed specification of the above numbered patent requiring correction and that the said Letters Patent should read as corrected below.

Column 1, line 35, for "temperature of" read -- temperature or --; column 3, lines 43 and 44, for "considering gear 20 to be the driving disc 28 in the clockwise direction, ball 36" read -- when disc 58 is driving gear 50 in the counter-clockwise direction, --; line 51, strike out "out", second occurrence; column 4, line 19, for "even" read -- uneven --.

Signed and sealed this 14th day of April 1959.

(SEAL)
Attest:

KARL H. AXLINE
Attesting Officer

ROBERT C. WATSON
                                                                                              Commissioner of Patents